United States Patent [19]

Hannan

[11] 4,037,418
[45] July 26, 1977

[54] LOAD SUPPORTING BEARING PLATE

[75] Inventor: John I. Hannan, Shadyside, Ohio

[73] Assignee: Phillips Stamping Co., Inc., Bellaire, Ohio

[21] Appl. No.: 685,695

[22] Filed: May 12, 1976

[51] Int. Cl.² .................... E21D 21/00; F16B 29/00
[52] U.S. Cl. ........................................ 61/45 B; 61/63
[58] Field of Search .................... 61/45 B, 45 R, 63; 85/1, 63; 299/11; D8/274

[56] References Cited

U.S. PATENT DOCUMENTS

| 3,161,174 | 12/1964 | Harrison | 61/45 B |
| 3,163,012 | 12/1964 | Dempsey | 61/45 B |
| 3,238,731 | 3/1966 | Seifert et al. | 61/45 B |
| 3,415,064 | 12/1968 | Talobre | 61/45 B |
| 3,478,523 | 11/1969 | Reusser et al. | 61/45 B |

FOREIGN PATENT DOCUMENTS

| 1,222,640 | 1/1960 | France | 61/45 B |
| 1,304,298 | 8/1962 | France | 61/45 B |

Primary Examiner—Dennis L. Taylor
Attorney, Agent, or Firm—Fay & Sharpe

[57] ABSTRACT

A generally flat rectangular bearing plate particularly adapted to cooperate with a plurality of other such plates in supporting an underground mine roof. One face of the plate defines a support or bearing surface and a major embossed area extends outwardly from and generally longitudinally along the other face for purposes of increasing the support strength of the plate. The top or outermost wall of the major embossed area tapers outwardly relative to the one face from a minimum height at opposed end areas adjacent the lengthwise ends of the plate to maximum height adjacent the midpoint of the plate. The opposed side walls of the major embossed areas diverge outwardly relative to each other from each of the opposed end areas toward the transverse axis of the plate. A recessed area having a generally flat bottom wall is provided at substantially the midpoint of the plate and which recessed area extends inwardly from the major embossed area top wall area back toward the support or bearing surface. The bottom wall is inwardly recessed a distance sufficient to conceal the head of an elongated bolt member received through an opening in the bottom wall for purposes of rigidly affixing the bearing plate to a mine roof. A minor embossed area extending outwardly from the major embossed area and surrounding the recessed area may also be included to add even further structural strength to the plate. Loop-like hangers may be conveniently included to facilitate the stringing of electrical cables, telephone wires and the like through the mine shaft once the plate has been installed.

32 Claims, 8 Drawing Figures

LOAD SUPPORTING BEARING PLATE

BACKGROUND OF THE INVENTION

This invention pertains to the art of load support or bearing equipment and more particularly to bearing plates of the type adapted to provide support for a generally planar surface.

The invention is particularly applicable to a mine roof bearing plate and will be described with particular reference thereto. However, it will be appreciated by those skilled in the art that the invention has broader applications and may be used in other environments where bearing plates of this general type are deemed necessary and/or desirable.

In underground mining operations of the type where a mine shaft is dug or gouged into the earth for mining purposes, it is necessary to support the roof of the shaft so that it will not cave in and ruin the mining operation with attendant equipment destruction and possible loss of human life. Originally, roofs of coal mine shafts and the like were supported by large wood timbers that extended generally transverse of the entire shaft between the side walls at periodic longitudinal intervals therealong. To provide the necessary support, these timbers or beams were usually rather thick, that is, 8 inches or more. Subsequently, it was found unnecessary to have these timbers extend across the entire mine roof to obtain acceptable roof support so that the individual supporting timbers could be shortened somewhat although the thickness thereof remained the same. The substantial beam thickness required was extremely undesirable in that they tended to reduce the effective mine roof or ceiling height.

As mining technology progressed, it was found desirable to utilize a substitute for the wooden support beams to increase or raise the effective mine roof or ceiling height. In addition, more stringent governmental regulations pertaining to mines and mine safety have been enacted which now require very specific mine roof support installations before the digging or construction of a mine shaft may even be commenced. Present regulations now require that specific plans for supporting any newly proposed mine shaft be approved prior to the time that any construction is undertaken. With such closer scrutiny of mining operations, the original wood supports have been variously replaced with supports which are stronger, have a reduced thickness and which normally have longer useful lives.

The present technology for constructing mine shafts is such that a special digging or gouging machine is utilized to dig an approximately 3 inch high initial shaft which is subsequently enlarged to the final desired dimensions. This digging process is continuous and is normally conducted directly through the vein of coal, ore or the like to be mined. The roof of the initial shaft is normally comprised of the material itself which is to be mined with the earth's strata disposed adjacent to and outwardly from this material. As digging of the initial shaft proceeds, the roof supports are immediately installed pursuant to the prior approved plans thereof.

The original wooden or timber supports were first replaced by flat steel plates which were individually mounted to the mine roof itself at periodic designated relative lateral and longitudinal intervals by means of elongated roof bolt members which passed through the plates and into the roofs themselves. These steel plates were originally at least 0.375 inches thick and were fairly expensive so that additional costs were added to the shaft construction. Moreover, this size and type of plate is rather heavy and was found very difficult to work with. When roof plates are first installed, there is a very limited area in which to work and the elongated roof bolts employed to affix the plates to the mine roof are sometimes as long as 10 feet. Under such conditions, the weight of these original plates became far more significant and troublesome than might otherwise seem to be the case.

For the past several years, there has been a trend in the mining industry toward the use of thinner plates now commonly referred to as roof bolt bearing plates in order to reduce the cost, weight and installation problems. The improvement made was to employ steel having a thickness of approximately 0.250 inch and to form the plates so as to have embossed areas which increase the structural rigidity thereof. The use of these thinner plates has been justified by the assumption that they may be made at least as strong as the thicker plates by merely embossing them. The structural rigidity of mine roof bolt bearing plates must meet certain governmental specifications and standards. The standards prescribe that the plates may deflect only certain amounts when supporting designated loads.

While there have been a number of prior designs for these embossed mine roof bearing plates, those which have been most readily accepted as meeting governmental standards have taken one of two primary design configurations, that is, the so-called "bell-type" and the "donut-type". The bell-type is embossed in a manner such that a cross-section thereof looks very much like a flattened bell and the donut-type is embossed in a manner such that a portion thereof taken in cross-section looks very much like a donut.

The present invention contemplates a new and improved bearing plate particularly adapted for use as a mine roof bolt bearing plate which overcomes all of the above referred to problems and others and which provides a bearing plate which is simple in design, economical to manufacture and utilize, facilitates effective support for a larger surface area of a roof, provides means to conceal the head of the mine roof bolt itself, provides means for reducing structural damage to the plate occasioned by accidental contact from mine equipment and machinery and which is readily adapted to use in a plurality of environments.

BRIEF DESCRIPTION OF THE INVENTION

In accordance with the present invention, there is provided a new bearing plate of the type adapted to provide support for a generally planar surface. The plate is comprised of a generally flat body having a length greater than the width with a longitudinal axis extending between the body ends and a transverse axis extending between the body side edges with the axes themselves intersecting at substantially the midpoint of the body. One face of the body defines a support surface adapted to be closely received against that planar surface which is to be supported. A major embossed area extends outwardly from the outer face of the body and is located so as to extend along the longitudinal axis over a major portion of the length thereof. A recessed area having a bottom wall extends inwardly from the outer surface of the major embossed area back toward the support surface and is coaxially disposed relative to the intersection of the body axes. An opening is provided in the recessed area bottom wall which is also coaxially disposed with this intersection and which is adapted to receive means for mechanically affixing the bearing plate to the planar surface.

In accordance with another aspect of the present invention, the major embossed area is symmetrically disposed about the body axes and defined by opposed end areas disposed inwardly from and adjacent to the lengthwise ends of the body, opposed side walls extending outwardly from the other face of the body and a top wall extending between the side walls with the recessed area extending inwardly from the top wall.

In accordance with still another aspect of the present invention, the recessed area bottom wall is located inwardly from the outermost extending portion of an embossed area so that the head of an elongated bolt employed to affix the bearing plate to a planar surface is concealed within the recessed area.

In accordance with another aspect of the present invention, the opposed side walls of the major embossed area diverge outwardly to a position at least immediately adjacent the body side edges at the intersection thereof with the body transverse axis, the opposed side walls converge toward each other from the other face to the top wall; and the top wall tapers outwardly from a minimum height at the opposed end areas of the major embossed area to a maximum height adjacent the recessed area.

In accordance with yet another aspect of the present invention, the bearing plate includes a minor embossed area disposed between the major embossed area and the recessed area coaxial with the intersection of the body axes. This minor embossed area has a generally semicircular transverse cross-section extending outwardly from the top wall of the major embossed area and then inwardly into the recessed area.

In accordance with a still further aspect of the present invention, the bearing plate includes at least one looplike member extending outwardly from the major embossed area top wall to accommodate the hanging or mounting of attendant mine equipment such as cables, wires and the like.

The principal object of the present invention is the provision of a new bearing plate of the embossed type which is simple in design.

Another object of the present invention is the provision of a new bearing plate of the embossed type which has increased structural rigidity over prior bearing plates of a similar type.

Still another object of the present invention is the provision of a new bearing plate of the embossed type which conceals the head of an elongated mounting bolt.

A still further object of the present invention is the provision of a new bearing plate of the embossed type which has a decreased overall height dimension.

Yet another object of the present invention is the provision of a new bearing plate of the embossed type in which the embossed area is tapered to prevent destruction thereof when accidently hit or contacted by machines, equipment or the like.

BRIEF DESCRIPTION OF THE DRAWINGS

The invention may take physical form in certain parts and arrangements of parts, preferred embodiments of which will be described in detail in this specification and illustrated in the accompanying drawings which form a part hereof and wherein.

DESCRIPTION OF THE PREFERRED EMBODIMENT

Referring now to the drawings wherein the showings are for purposes of illustrating preferred embodiments of the invention only and not for purposes of limiting same, the FIGURES show an embossed roof bolt bearing plate A mounted in a manner to support roof area B of a mine shaft by means of an elongated mine roof bolt C.

Referring particularly to FIGS. 2-5, bearing plate A has a generally rectangular body 10 with a longitudinal axis $a$ extending between opposed ends 12,14 and a transverse axis $b$ extending between opposed side edges 16,18. Axes $a$ and $b$ intersect at intersection $c$ which is located at substantially the midpoint of the body. One face 20 of body 10 defines a bearing or support surface while the opposed face 22 defines an outer surface. Extending outwardly from face 22 is a major embossed area generally designated 24, a minor embossed area generally designated 26 and a recessed area generally designated 28. Specific description of areas 24,26 and 28 will be made hereinafter.

Body 10, including areas 24,26 and 28, is integrally formed from steel of a type having a high minimum yield strength. In the preferred structure, a steel having a rating of at least 80,000 psi minimum yield strength is contemplated for use in order to meet and surpass the strength requirement set by various governmental bodies. The plate may be conveniently formed by conventional sheet metal working techniques and the steel blank so formed is initially substantially rectangular. The final bearing plate configuration is slightly deformed from the substantially rectangular configuration due to inherent characteristics in the forming operation itself. In the preferred arrangement, body 10 has a length dimension of approximately 16 inches and a width dimension of approximately 6 inches, although these dimensions could be varied somewhat without departing from the intent or scope of the present invention. Moreover, the preferred thickness of the body between faces 20,22 is preferably in the range of between 0.163 inch to 0.190 inch. However, this dimension could also be varied somewhat without departing from the intent or scope of the present invention.

Referring now to the specifics of major embossed area generally designated 24, this area includes opposed side wall portions 40,44 and 42,46 which merge into top wall portions 48,50 respectively, at radiused zones 52,54. Opposed end areas 56,58 are defined by area 24 and disposed adjacent body ends 12,14, respectively. As best noted in FIG. 3, major embossed area 24 is symmetrically disposed about both the body longitudinal axis $a$ and the body transverse axis $b$. As best shown in FIG. 4, top wall portions 48,50 taper outwardly of face 22 from a minimum height at end areas 48,50 to a maximum height adjacent minor embossed area 26, recessed area 28 and transverse axis b.

Figure 2:
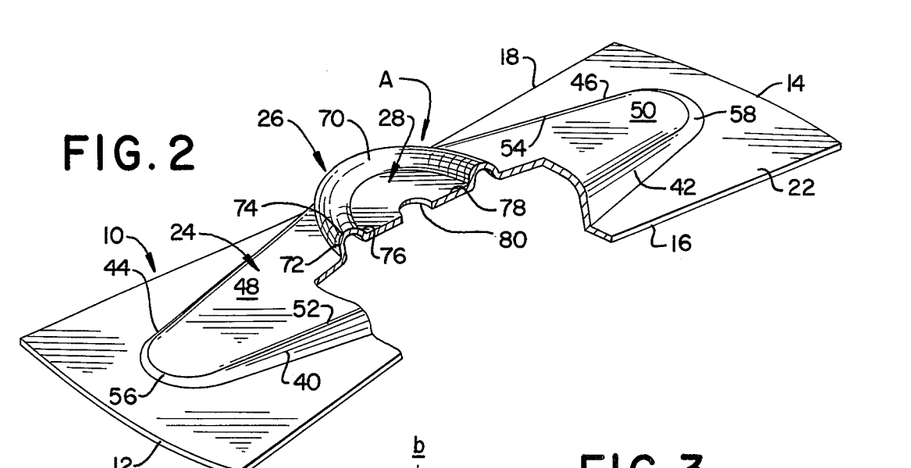
FIG. 2 is a perspective view in partial cross-section showing the subject new bearing plate.
Figure 3:
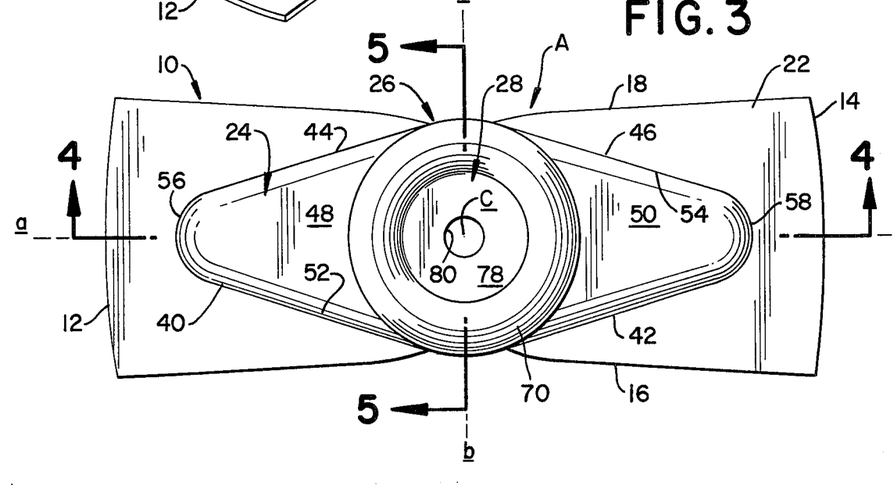
FIG. 3 is a plan view of the new bearing plate.
Figure 4:
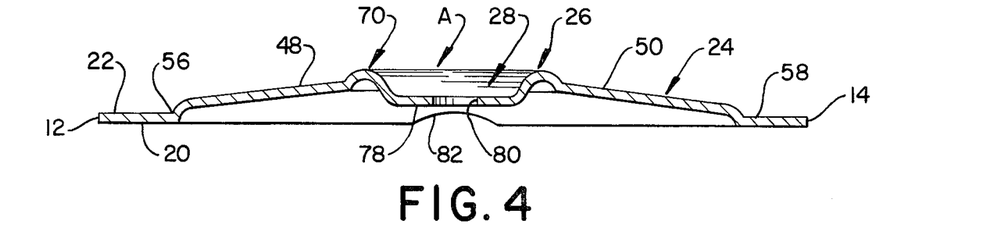
FIG. 4 is a cross-sectional view taken along lines 4—4 of FIG. 3.
Figure 5:
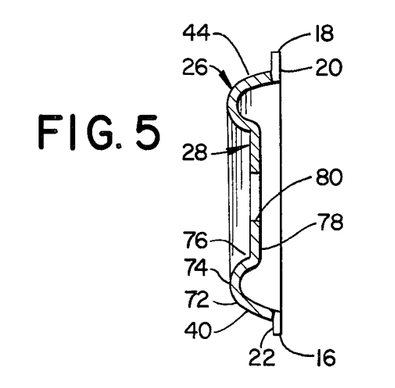
FIG. 5 is a cross-sectional view taken along lines 5—5 of FIG. 3.

Referring particularly to FIGS. 2, 3 and 5, it will be noted that side wall portions 40,44 diverge outwardly from each other from end area 56 toward transverse axis b and that side wall portions 42,46 diverge outwardly from end area 59 toward transverse axis b. Side wall portions 40,42 and 44,46 generally meet at transverse axis b and include side edges 16,18 at and adjacent their junction areas. Further, it will be seen that side wall portions 40,44 converge toward each other from face 22 toward top wall portion 48 over the longitudinal length of the side wall portions and that side wall portions 42,46 similarly converge from face 22 toward top wall portion 50 over the longitudinal lengths thereof. Again, major embossed area 24 is symmetrically disposed on body 10 about both the body longitudinal and transverse axes a, b.

Minor embossed area 26 is substantially coaxially disposed relative to intersection c of the body axes and has a substantially circular configuration generally designated 70 in the FIGS. In cross-section and as best shown in FIGS. 2, 4 and 5, minor embossed area 26 extends outwardly from major embossed area 24 and has a generally semi-circular configuration in transverse cross-section. This generally semi-circular configuration is shown as having a slightly curvilinear outer leg 72 merging into a curvilinear central or top portion 74 which then merged into an inner leg 76. Inner leg 76 extends back toward outer face 22 and in this embodiment, defines recess area 28. Disposed at the bottom of inner leg 76 and defining the innermost portion of the recessed area is a generally flat and circular bottom wall 78 having a mounting opening 80 therethrough. Opening 80 is coaxially disposed relative to intersection c of body axes a, b. Bottom wall 78 is also advantageously disposed generally parallel to the planes of faces 20,22.

In the preferred embodiment here under discussion, recircular bottom wall 78 has a diameter sufficient to receive a socket for advancing elongated minor roof bolt C in a manner to be described hereinafter. Typically, however, the diameter of bottom wall 78 will be 2.75 inches. Moreover, and as best shown in FIGS. 1, 2, 4 and 5, bottom wall 78 is recessed from the plane defined by the outermost area of central portion 74 of the minor embossed area an amount sufficient to conceal the head of elongated mine roof bolt C. In the preferred embodiment of the present invention, the preferred distance is 0.560 inch. The diameter of opening 80 is sufficient to closely slidably receive the outside of elongated roof bolt C and preferably normally varies from between 0.688 inch to 1.375 inch to accommodate convenient bolt sizes. Opening 80 may be varied, however, without departing from the intent and scope of the present invention.

Figure 1:
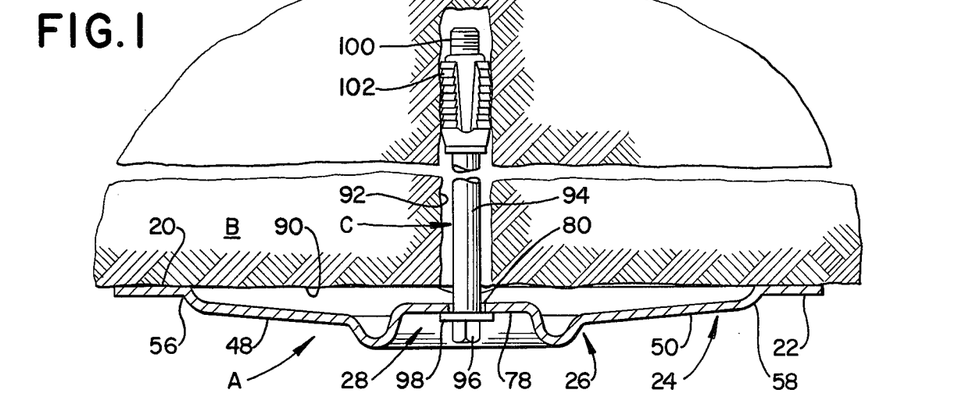
FIG. 1 is a cross-sectional view showing a typical installation for the subject new bearing plate.

Referring particularly to FIG. 1, description will hereinafter be made to the installation of the subject new bearing plate in a mine shaft environment. Once the initial shaft has been dug or gouged into the earth as hereinabove previously outlined, it is necessary to immediately install the requisite mine roof bolt bearing plates in their predetermined position to support the mine shaft roof. That is, bearing plate A is mounted so that bearing or support surface 20 will engage generally planar surface 90 of the mine roof. Of course, a plurality of identical mine roof bolt bearing plates are installed in accordance with a prior plan and description of one such installation is deemed applicable to all.

Accordingly, at the precise location where bearing plate A is to be installed, an elongated bolt receiving opening hole 92 is drilled by conventional means into the mine roof itself. This bolt receiving opening may be as long as 10 feet or so and may extend through both that material which is to be mined and the adjacent strata. Roof bolt C has an elongated bolt shank 94 having a bolt head 96 and a mounting flange 98 (or suitable hardened steel washer) disposed at one end thereof and a relatively short threaded area 100 disposed at the other end thereof. The threaded area and shank are passed through opening 80 into bolt receiving opening 92 with threaded area 100 engaging a fairly conventional or standard expansion insert 102 at the innermost end thereof to retain the bolt in position. Other means besides expansion insert 102 may also be advantageously employed. However, inasmuch as such means do not form a part of the present invention, further specific elaboration thereon is deemed unnecessary. When the bolt is in position, flange 98 will engage bottom wall 78 around opening 80 to rigidly retain the bearing plate in position with bearing surface 20 engaging generally planar surface 90. Flange 98 may either comprise a separate washer-like member received on the mounting bolt (⅛ inch hardened steel washers have been used in the industry in connection with shell type inserts) or may be an integral part of bolt head 96 itself.

The mounting bolt is conveniently threadedly advanced into expansion insert 102 toward a retaining position with the bearing plate by a pneumatic type wrench or socket arrangement as is known in the art and under predetermined prescribed torqued conditions. The diameter of circular bottom wall 78 is such that it will accommodate the socket arrangement required to effect such tightening of the bolt through means of head 96. The typical or conventional height of bolt head 96, including the thickness of flange 98, is approximately 0.440 inch. Thus, since the depth of recessed area 28 from the outermost edge of minor embossed area 26 is preferably 0.560 inches, the bolt head and flange will be concealed within recessed area 28 as specifically shown in FIG. 1. This is deemed particularly advantageous since machinery, equipment and the like passing through the mine shaft sometimes accidentally hit or contact the bearing plates due to the low height of conventional mine roofs and which can cause damage to the mounting bolts if they were not otherwise protected.

Once bearing plate A has been installed with the mounting bolt tightened to a predetermined torque, the plate will support that area of the mine roof engaged by face 20. The primary work axis of the bearing plate is along longitudinal axis a and major embossed area 24 provides the necessary strength therealong to prevent deflection of the bearing plate within the prescribed limit. Minor embossed area 26 adds some strength to the overall bearing plate configuration particularly along longitudinal axis a and also creates a bumper effect to protect bolt head 96 and flange 98. In addition the minor embossed area 26 defines legs 72, 76 and top portion 74 which serve to add strength to the plate along transverse axis b. Under extreme loading which causes deflection in the bearing plate, the generally flat areas of body 10 disposed outboard of major embossed area 24 between that area, ends 12,14 and side edges 16,18 will be the first to deflect and will deflect about axis a. The subject bearing plate is designed such that there will be no deflection of the major embossed area under extreme loading conditions and that such deflection will be resisted even beyond the strength of the mine roof bolt itself. Thus, the mine roof bolt will yield or shear before there is any significant deflection of the subject bearing plate at major embossed area 24.

In the preferred arrangement here under discussion, and in order that the bearing plate will extend downwardly from the mine roof surface 90 a minimum distance, the height between face or bearing surface 20 to the outermost point of central portion 74 of minor embossed area 26 is approximately only 1.125 inches. This is deemed to be an improvement over the prior art in that it allows for more working space within the mine shaft between the shaft floor and roof or ceiling. Many of the prior art bearing plates have had similar heights of 2 inches or more. While a height savings of only 1 inch or so may not seem to be substantial, any savings in a mine shaft which is initially only 36 inches high is indeed deemed to be beneficial as providing a greater working area.

Finally, it should be noted that, and as described in detail hereinabove, top wall portions 48,50 taper outwardly or increase in their height dimension from end areas 56,58 inwardly toward minor embossed area 26, recessed area 28 and transverse axis *b*. This configuration is deemed to be beneficial from the standpoint that it provides camming surfaces to deflect blows received thereagainst by passing machinery, equipment and the like which could otherwise cause damage to or ruin the overall bearing plate structure thus requiring replacement thereof. That is, engagement of top wall portions 48,50 by any such machinery or equipment will be gradual rather than sudden and may eliminate the necessity for replacing damaged bearing plates as would otherwise be the case.

Figure 6:
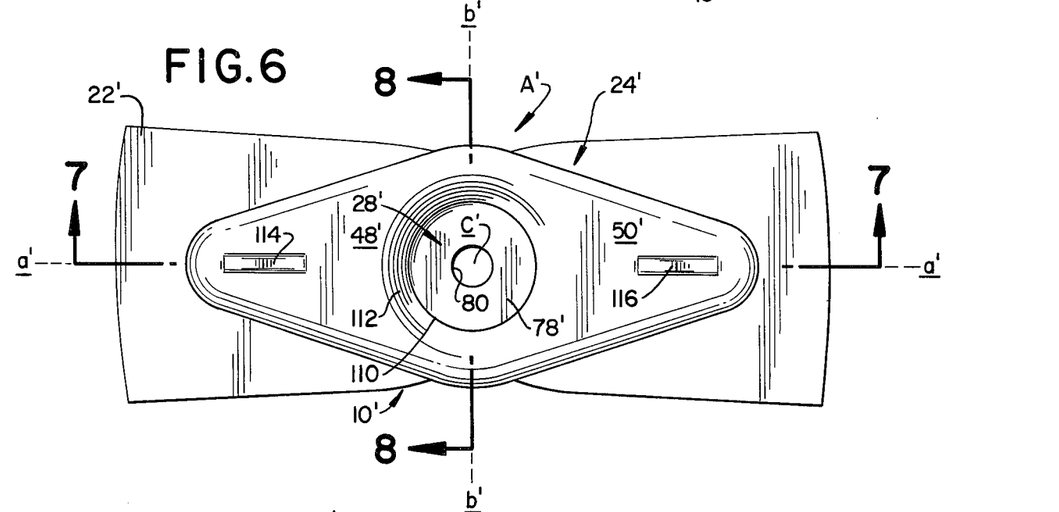
FIG. 6 is a plan view of a modified bearing plate construction incorporating the concepts of the subject invention.
Figure 7:
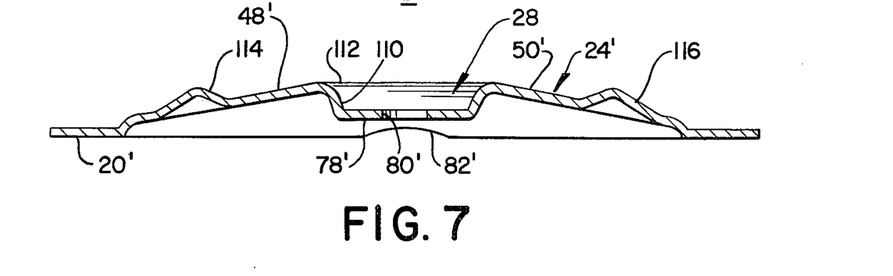
FIG. 7 is a cross-sectional view taken along lines 7—7 in FIG. 6.
Figure 8:
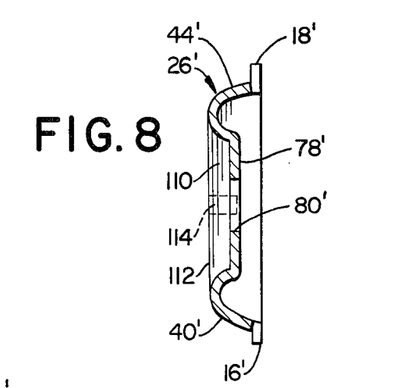
FIG. 8 is a cross-sectional view taken along lines 8—8 of FIG. 6.

FIGS. 6–8 show a modified form of the present invention which eliminates major embossed area 24 and includes hanger areas for accommodating electrical cables, telephone links and the like. For ease of illustration and appreciation of this modification, like components are identified by like numerals with the inclusion of a primed (') suffix and new components are identified by new numerals.

In this modified arrangement, top wall portions 48', 50' taper outwardly of body 10' from the end areas toward recessed area 28' and transverse axis *b'*. Here, however, the top wall portions merge directly into the side wall 110 of recessed area 28' at a radiused area 112. In this arrangement, the transverse distance between the plane defined by the outermost areas of the top wall portions adjacent radiused area 112 and bottom wall 78' of recessed area 28' is such that it will again conceal the bolt head of an associated mine roof bolt. While this particular configuration also provides extremely advantageous operational results, it does not include the same substantial structure rigidity about the longitudinal axis *a'* as does the preferred arrangement discussed hereinabove with reference to FIGS. 1–5.

Also in the embodiment of FIGS. 6–8, there are included a pair of spaced apart hangers 114, 116 protruding outwardly from top wall portions 48', 50', respectively. These hangers are generally loop-like members and are formed integrally with the bearing plate itself by conventional metal working techniques. For protective purposes, the outermost surfaces of hangers 114, 116 do not extend outwardly any further than the furthest outwardly extending areas of top wall portions 48', 50'. The openings defined by the loop-like configuration of hangers 114, 116 extend generally parallel to transverse axis *b'* and are longitudinally disposed on top wall portions along longitudinal axis *a'*.

This hanger arrangement facilitates the stringing of electrical cables, telephone wires and the like therethrough along the mine shaft itself. In some circumstances where heavy duty cables, wires or attendant mine equipment so dictate, it may be necessary to suspend separate hooks from hangers 114, 116 in order to fully accommodate this attendant mine equipment. It should also be noted that it is possible to vary the size, number and location of these hangers to suit some specific mine needs or special circumstances and that these hangers are equally adaptable for use in the embodiment hereinabove described with reference to FIGS. 1–5. As an example, hangers may be defined in the planar portions of face 22 (FIG. 3) or face 22' (FIG. 6) in those instances where it is desired not to interrupt top wall portions 48, 50 (FIG. 3) or 48', 50' (FIG. 6). Alternately, the walls defining the relieved portions 82 (FIG. 4) and 82' (FIG. 7) may be used to receive hooks or other members in order to support electrical cables, telephone wires, etc.

The invention has been described with reference to preferred embodiments. Obviously, modifications and alterations will occur to others upon the reading and understanding of the specification. For example, the invention has been particularly described with reference as a mine roof bolt bearing plate although it could also be employed in any number of other load supporting environments. It is my intention to include all such modifications and alterations insofar as they come within the scope of the appended claims or the equivalents thereof.

Having thus described my invention, I now claim:

1. A low profile bearing plate of the type adapted to provide support for a generally planar surface, said plate comprising:

a generally flat body having a length greater than the width with a longitudinal axis extending between the body ends and a transverse axis extending between the body sides with said axes intersecting at substantially the midpoint of said body, one face of said flat body defining a generally planar plate bearing surface adapted to be closely received against a generally planar surface; an elongated major embossed area extending outwardly from the other face of said body and being located so as to extend along said longitudinal axis over a major portion of the body length; the height of said major embossed area being such that said plate defines a relatively low profile; a recessed area extending inwardly from the outer surface of said major embossed area back toward said plate bearing surface and being coaxially disposed relative to the intersection of said body axes, said recessed area having a bottom wall disposed generally parallel to and spaced from said plate bearing surface; and, an opening in said bottom wall coaxially disposed with the intersection of said body axes adapted to receive headed fastener means for affixing said support plate to a generally planar surface; the depth of said recessed area being such that when said fastener means is received in said opening, at least a portion of the head of said fastener means is concealed within said recessed area.

2. The bearing plate as defined in claim 1 wherein said major embossed area has opposed end areas disposed inwardly from and adjacent said body ends, opposed side walls extending outwardly from said other face and merging into a top wall with said recessed area extending inwardly from adjacent said top wall, said major embossed area being symmetrically disposed about both of said body axes.

3. The bearing plate as defined in claim 2 wherein said plate is adapted to be affixed to a planar surface by an elongated member passing through said bottom wall opening with such elongated member including means for engaging said bottom wall adjacent said opening, said bottom wall being disposed inwardly from the plane defined by the outermost extending surface of said top wall a sufficient distance such that such engaging means and the outermost end of said elongated member are also substantially disposed inwardly of said plane.

4. The bearing plate as defined in claim 2 wherein said opposed side walls diverge outwardly relative to each other from each of said opposed end areas toward said transverse axis, said side walls merging into said top wall along radiused zones.

5. The bearing plate as defined in claim 4 wherein said opposed side walls diverge outwardly to a position at least immediately adjacent said body side edges at the intersection thereof with said transverse axis.

6. The bearing plate as defined in claim 4 wherein said opposed side walls converge toward each other from said other face toward said top wall.

7. The bearing plate as defined in claim 4 wherein said top wall tapers outwardly of said body from a minimum height at said opposed end areas toward a maximum height adjacent said recessed area.

8. The bearing plate as defined in claim 7 wherein said major embossed area is generally parallel to said plate bearing surface at said recessed area.

9. The bearing plate as defined in claim 2 further including a minor embossed area adjacent said major embossed area and said recessed area, a portion of said minor embossed area extending outwardly from said major embossed area top wall.

10. The bearing plate as defined in claim 9 wherein said minor embossed area is coaxial with the intersection of said body axes and is generally semi-circular in transverse cross-section.

11. The bearing plate as defined in claim 10 wherein said opposed side walls diverge outwardly relative to each other from each of said opposed end areas toward said transverse axis, said side walls merging into said top wall along radiused zones.

12. The bearing plate as defined in claim 11 wherein said opposed side walls diverge outwardly to a position at least immediately adjacent said body side edges at the intersection thereof with said transverse axis.

13. The bearing plate as defined in claim 11 wherein said opposed side walls converge toward each other from said other face toward said top wall.

14. The bearing plate as defined in claim 11 wherein said top wall tapers outwardly of said body from a minimum height at said opposed end area to a maximum height adjacent said minor embossed area.

15. The bearing plate as defined in claim 14 wherein the outermost extending portion of said minor embossed area defines a plane generally parallel to said plate bearing surface.

16. The bearing plate as defined in claim 10 wherein said recessed area bottom wall is disposed inwardly toward said plate bearing surface from the plane defined by the outermost extending surface of said minor embossed area.

17. The bearing plate as defined in claim 16 wherein said plate is adapted to be affixed to a planar surface by an elongated member passing through said bottom wall opening with such elongated member including means for engaging said bottom wall adjacent said opening, said bottom wall being disposed inwardly from said plane defined by the outermost extending surface of said minor embossed area a sufficient distance such that such engaging means and the outermost end of said elongated members are also substantially disposed inwardly of said plane.

18. The bearing plate as defined in claim 2 further including at least one attachment area extending outwardly from said body adapted to provide means for mounting ancillary equipment to said plate.

19. The bearing plate as defined in claim 18 wherein said at least one attachment area comprises a narrow loop-like member defining a mounting opening.

20. The bearing plate as defined in claim 19 wherein said loop-like member is disposed on said top wall on one side of said transverse axis.

21. The bearing plate as defined in claim 20 wherein said loop-like member is disposed along the longitudinal axis of said body with the opening defined thereby arranged to extend generally parallel to said transverse axis.

22. A low profile mine roof bolt bearing plate of the type adapted to provide support for a roof of an underground mine, said bearing plate comprising:

a generally flat body having a length greater than the width with a longitudinal axis extending between the body ends and a transverse axis extending between the body side edges with said axes intersecting at substantially the midpoint of said body, one face of said flat body defining a generally planar plate bearing surface adapted to be closely received against a generally planar surface defined by a mine roof; an elongated major embossed area symmetrically disposed about said body axes extending outwardly from the other face of said body and being located so as to extend along said longitudinal axis over a major portion of the length of said body, the height of said major embossed area being such that said plate defines a relatively low profile, said major embossed area having opposed end areas disposed inwardly from and adjacent to said body ends, opposed side walls extending outwardly from said other body face and diverging outwardly relative to each other from each of said opposed end areas toward said transverse axis and merging into a top wall at the outermost ends thereof along radiused zones; a recessed area coaxially disposed relative to said body axes extending inwardly from said major embossed area back toward said plate bearing surface and having a bottom wall disposed generally parallel to said plate bearing surface; and, an opening in said bottom wall coaxially disposed with the intersection of said body axes adapted to receive headed fastener means for affixing said bearing plate to a generally planar surface defined by a mine roof, the depth of said recessed area being such that when said fastener means is received in said opening, at least a portion of the head of said fastener means is concealed within said recessed area.

23. The bearing plate as defined in claim 22 wherein said opposed side walls diverge outwardly to a position at least immediately adjacent said body side edges at the intersection thereof with said transverse axis, said opposed side walls converging toward each other from said other face toward said top wall and said top wall tapers outwardly from a minimum height at said opposed end areas to a maximum height adjacent said recessed area.

24. The bearing plate as defined in claim 23 wherein said plate is adapted to be affixed to a mine roof by an elongated member passing through said bottom wall opening with such elongated member including means for engaging said bottom wall adjacent said opening, said bottom wall being disposed inwardly from the plane defined by the outermost extending area of said top wall a distance sufficient to at least partially conceal such engaging means and the outermost end of such elongated member within said recessed area.

25. The bearing plate as defined in claim 23 further including a minor embossed area adjacent said major embossed area and said recessed area coaxial with the intersection of said body axes, said minor embossed area having a generally semi-circular transverse cross-section extending outwardly from the top wall of said major embossed area.

26. The bearing plate as defined in claim 25 wherein said recessed area bottom wall is disposed inwardly from the plane defined by the outermost extending surface of said minor embossed area.

27. The bearing plate as defined in claim 26 wherein said plate is adapted to be affixed to a mine roof by an elongated member passing through said bottom wall opening, said elongated member including means for engaging said bottom wall adjacent said opening, said bottom wall being disposed inwardly from said plane defined by the outermost extending surface of said minor embossed area a distance sufficient so that such engaging means and the outermost end of such elongated member are at least partially concealed within said recessed area.

28. The bearing plate as defined in claim 23 further including attachment means adapted to provide for the mounting of ancillary equipment to said plate.

29. The bearing plate as defined in claim 28 wherein said attachment means is defined by a loop-like member extending from said other face of said plate.

30. The bearing plate as described in claim 28 in which said attachment means is defined by at least one relieved portion adjacent one of said side walls at said intersection.

31. A low profile bearing plate of the type adapted to provide support for a generally planar surface, said plate comprising:
a generally flat body having a length greater than the width with a longitudinal axis extending between the body ends and a transverse axis extending between the body sides with said axes intersecting at substantially the midpoint of said body, one face of said flat body defining a generally planar plate bearing surface adapted to be closely received against a generally planar surface; an elongated major embossed area extending outwardly from the other face of said body generally symmetrically disposed about both of said body axes and having a length as measured along said longitudinal axis greater than the width as measured along said transverse axis, the height of said major embossed area being such that said plate defines a relatively low profile, said major embossed area including opposed end areas disposed inwardly from and adjacent said body ends and opposed side areas diverging outwardly of each other from each of said end areas toward said transverse axis; a recessed area extending inwardly from the outer surface of said major embossed area back toward said plate bearing surface and being coaxially disposed relative to the intersection of said body axes, said recessed area having a bottom wall disposed generally parallel to and spaced from said plate bearing surface; and, an opening in said bottom wall coaxially disposed with the intersection of said body axes adapted to receive means for affixing said support plate to a generally planar surface.

32. A low profile bearing plate of the type adapted to provide support for a generally planar surface, said plate comprising:
a generally flat body having a length greater than the width with a longitudinal axis extending between the body ends and a transverse axis extending between the body sides with said axes intersecting at substantially the midpoint of said body, one face of said flat body defining a plate bearing surface adapted to be closely received against a generally planar surface; an elongated major embossed area extending outwardly from the other face of said body and being located so as to extend along said longitudinal axis over a major portion of the body length from opposed end areas disposed adjacent said body ends, said major embossed area including a top wall and opposed side areas diverging outwardly of each other from each of said end areas toward a maximum spaced apart distance therebetween at least at said transverse axis; a recessed area extending inwardly from the outer surface of said major embossed area back toward said plate bearing surface and being coaxially disposed relative to the intersection of said body axes, said recessed area having a bottom wall disposed generally parallel to and spaced from said plate bearing surface; a minor embossed area in said major embossed area top wall adjacent said recessed area; and, an opening in said bottom wall coaxially disposed with the intersection of said body axes adapted to receive means for affixing said support plate to a generally planar surface.

* * * * *

© REEXAMINATION CERTIFICATE (267th)

United States Patent [19]

Hannan

[11] B1 4,037,418

[45] Certificate Issued  Oct. 30, 1984

[54] LOAD SUPPORTING BEARING PLATE

[75] Inventor: John I. Hannan, Shadyside, Ohio

[73] Assignee: Phillips Stamping Co., Inc., Bellaire, Ohio

Reexamination Request:
No. 90/000,224, Jul. 6, 1982

Reexamination Certificate for:
Patent No.: 4,037,418
Issued: Jul. 26, 1977
Appl. No.: 685,695
Filed: May 12, 1976

[51] Int. Cl.$^3$ ............................................. E21D 21/00
[52] U.S. Cl. ..................................... 405/259; 405/303; 411/531; 299/11; D8/274
[58] Field of Search .............. 405/259, 260, 261, 262; D8/399; 411/15, 531, 544, 155, 156

[56] References Cited

U.S. PATENT DOCUMENTS 2,854,824 10/1958 Curry et al. ........................ 405/259
3,161,174 12/1964 Harrison ............................ 405/259

OTHER PUBLICATIONS

Practical Design of Sheet Metal Stampings, Chapters 10 and 15, Chapter 15, 115–117, Figures 330 and 332, Copyright 1959.
Machine Design, "Metal Stampings" by Federico Strasser, pp. 105 and 106, Nov. 1, 1956.
Report to American Mining Congress Subcommittee-Rigidity of Roof Bolt Bearing Plates by J. A. McCormick and J. H. Stears.
Mining Congress Journal, "Standards for Roof Bolt Plates and Drill Bits" by Frank L. Gaddy, Oct., 1956, p. 41.
Coal Age, "Roof Control and Mine Bolts", Mar. 1963, p. 90.
Engineering and Mining Journal, "Research Develops Angle Roof Bolt at White Pine Copper Mine", vol. 167–No. 3, Mar. 1966, by G. W. Allen.
Engineering and Mining Journal, "Steel Header Plates Eliminate the Weak Link in Roof Bolting", p. 104, Apr. 1972.
Drawing No. 1212-2-69 entitled "6×18" Mine Roof Plate Alt for Spherical Washer", Birmingham Fabricating Co., Birmingham, Alabama, Mar. 18, 1969.
Drawing No. A–16263 entitled "¼×6×16 Header Plate", Republic Steel Corporation, Cleveland, Ohio, Jun. 19, 1972.

*Primary Examiner*—Dennis L. Taylor

[57] ABSTRACT

A generally flat rectangular bearing plate particularly adapted to cooperate with a plurality of other such plates in supporting an underground mine roof. One face of the plate defines a support or bearing surface and a major embossed area extends outwardly from and generally longitudinally along the other face for purposes of increasing the support strength of the plate. The top or outermost wall of the major embossed area tapers outwardly relative to the one face from a minimum height at opposed end areas adjacent the lengthwise ends of the plate to maximum height adjacent the midpoint of the plate. The opposed side walls of the major embossed areas diverge outwardly relative to each other from each of the opposed end areas toward the transverse axis of the plate. A recessed area having a generally flat bottom wall is provided at substantially the midpoint of the plate and which recessed area extends inwardly from the major embossed area top wall area back toward the support or bearing surface. The bottom wall is inwardly recessed a distance sufficient to conceal the head of an elongated bolt member received through an opening in the bottom wall for purposes of rigidly affixing the bearing plate to a mine roof. A minor embossed area extending outwardly from the major embossed area and surrounding the recessed area may also be included to add even further structural strength to the plate. Loop-like hangers may be conveniently included to facilitate the stringing of electrical cables, telephone wires and the like through the mine shaft oce the plate has been installed.

B1 4,037,418

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claim 32 is confirmed.

Claim 9 is cancelled.

Claims 1, 10, 22, 23, 25, 26, 27 and 31 is determined to be patentable as amended.

Claims 2-8, 11-21, 24 and 28-30, dependent on an amended claim, are determined to be patentable.

1. A low profile bearing plate of the type adapted to provide support for a generally planar surface, said plate comprising:
 a generally flat body having a length greater than the width with a longitudinal axis extending between the body ends and a transverse axis extending between the body sides with said axes intersecting at substantially the midpoint of said body, one face of said flat body defining a generally planar plate bearing surface adapted to be closely received against a generally planar surface; an elongated major embossed area extending outwardly from the other face of said body and being located so as to extend along said longitudinal axis over a major portion of the body length; the height of said major embossed area being such that said plate defines a relatively low profile; a recessed area extending inwardly from the outer surface of said major embossed area back toward said plate bearing surface and being coaxially disposed relative to the intersection of said body axes, said recessed area having a bottom wall disposed generally parallel to and spaced from said plate bearing surface; *a minor embossed area adjacent said major embossed area and said recessed area, a portion of said minor embossed area extending outwardly from said major embossed area top wall;* and, an opening in said bottom wall coaxially disposed with the intersection of said body axes adapted to receive headed fastener means for affixing said support plate to a generally planar surface; the depth of said recessed area being such that when said fastener means is received in said opening, at least a portion of the head of said fastener means is concealed within said recessed area.

10. The bearing plate as defined in claim [9] *1* wherein said minor embossed area is coaxial with the intersection of said body axes and is generally semi-circular in transverse cross-section.

22. A low profile mine roof bolt bearing plate of the type adapted to provide support for a roof of an underground mine, said bearing plate comprising:
 a generally flat body having a length greater than the width with a longitudinal axis extending between the body ends and a transverse axis extending between the body side edges with said axes intersecting at substantially the midpoint of said body, one face of said flat body defining a generally planar plate bearing surface adapted to be closely received against a generally planar surface defined by a mine roof; an elongated major embossed area symmetrically disposed about said body axes extending outwardly from the other face of said body and being located so as to extend along said longitudinal axis over a major portion of the length of said body, the height of said major embossed area being such that said plate defines a relatively low profile [, said major embossed area having opposed end areas disposed inwardly from and adjacent to said body ends, opposed side walls extending outwardly from said other body face and diverging outwardly relative to each other from each of said opposed end areas toward said transverse axis and merging into a top wall at the outermost ends thereof along radiused zones]; *a circular embossment including* a recessed area coaxially disposed relative to said body axes, *said recessed area* extending inwardly from said major embossed area back toward said plate bearing surface and having a bottom wall disposed generally parallel to said plate bearing surface; *said circular embossment being superimposed on said major embossed area;* and, an opening in said bottom wall coaxially disposed with the intersection of said body axes adapted to receive headed fastener means for affixing said bearing plate to a generally planar surface defined by a mine roof, the depth of said recessed area being such that when said fastener means is received in said opening, at least a portion of the head of said fastener means is concealed within said recessed area.

23. The bearing plate as defined in claim 22 wherein said *major embossed area has* opposed side walls *which* diverge outwardly to a position at least immediately adjacent said body side edges at the intersection thereof with said transverse axis, said opposed side walls converging toward each other from said other face toward [said] *a* top wall and said top wall tapers outwardly from a minimum height at [said] opposed end areas *spaced from said recessed area* to a maximum height adjacent said recessed area.

25. The bearing plate as defined in claim 23 [further including a minor embossed area] *wherein said circular embossment is* adjacent said major embossed area and said recessed area coaxial with the intersection of said body axes, said [minor embossed area] *circular embossment* having a generally semi-circular transverse cross-section extending outwardly from the top wall of said major embossed area.

26. The bearing plate as defined in claim 25 wherein said recessed area bottom wall is disposed inwardly from the plane defined by the outermost extending surface of said [minor embossed area] *circular embossment.*

27. The bearing plate as defined in claim 26 wherein said plate is adapted to be affixed to a mine roof by an elongated member passing through said bottom wall opening, said elongated member including means for engaging said bottom wall adjacent said opening, said bottom wall being disposed inwardly from said plane defined by the outermost extending surface of said [minor embossed area] *circular embossment* a distance sufficient so that such engaging means and the outermost end of such elongated member are at least partially concealed within said recessed area.

31. A low profile bearing plate of the type adapted to provide support for a generally planar surface, said plate comprising:

a generally flat body having a length greater than the width with a longitudinal axis extending between the body ends and a transverse axis extending between the body sides with said axes intersecting at substantially the midpoint of said body, one face of said flat body defining a generally planar plate bearing surface adapted to be closely received against a generally planar surface; an elongated major embossed area extending outwardly from the other face of said body generally symmetrically disposed about both of said body axes and having a length as measured along said longitudinal axis greater than the width as measured along said transverse axis, the height of said major embossed area being such that said plate defines a relatively low profile[, said major embossed area including opposed end areas disposed inwardly from and adjacent said body ends and opposed side areas diverging outwardly of each other from each of said end areas toward said transverse axis]; *a minor embossed area having* a recessed area extending inwardly from the outer surface of said major embossed area back toward said plate bearing surface and being coaxially disposed relative to the intersection of said body axes, said recessed area having a bottom wall disposed generally parallel to and spaced from said plate bearing surface; *said minor embossed area being superimposed on said major embossed area;* and, an opening in said bottom wall coaxially disposed with the intersection of said body axes adapted to receive means for affixing said support plate to a generally planar surface.

* * * * *